United States Patent [19]
Singh

[11] 3,781,562
[45] Dec. 25, 1973

[54] MOSSBAUER SPECTROMETER RADIATION DETECTOR

[75] Inventor: Jag J. Singh, Yorktown, Va.

[73] Assignee: The United States of America as represented by the Administrator of the National Aeronautics and Space Administration, Washington, D.C.

[22] Filed: Dec. 8, 1972

[21] Appl. No.: 313,381

[52] U.S. Cl. .................. 250/360, 250/361, 250/369, 250/492
[51] Int. Cl. ............................................ G01j 39/18
[58] Field of Search .................... 250/276, 361, 367, 250/458, 485, 486

[56] References Cited
UNITED STATES PATENTS

| | | | |
|---|---|---|---|
| 2,858,452 | 10/1958 | Wouters | 250/367 |
| 2,911,534 | 11/1959 | Brannon et al. | 250/486 |
| 2,666,145 | 1/1954 | Eversole et al. | 250/367 |
| 3,404,277 | 10/1968 | Jerko | 250/359 |
| 3,257,558 | 6/1966 | Cook | 250/272 |
| 3,612,875 | 11/1971 | Ord | 250/360 |

*Primary Examiner*—Harold A. Dixon
*Attorney*—Howard J. Osborn et al.

[57] ABSTRACT

The invention is a versatile Mössbauer spectrometer with high efficiencies in both transmission and backscattering techniques. The heart of the invention is a detector which includes an NaI(Tl) crystal for detecting radiation caused by the Mössbauer effect. The crystal has a hole in its center to allow the collimated incident radiation to pass through and it is coupled through two quartz optical windows to two photomultipliers such that all of the scintillation radiation produced by the radiation detected by the crystal will flow into the two photomultipliers. When used in a transmission technique the sample or scatterer is placed between the incident radiation source and the detector; and when used in a backscattering technique the detector is placed between the incident radiation source and the sample or scatterer such that the incident radiation will pass through the hole in the crystal and strike the sample.

6 Claims, 2 Drawing Figures

MOSSBAUER SPECTROMETER RADIATION DETECTOR

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates generally to spectrometry and more specifically concerns a versatile Mössbauer spectrometer with high efficiencies in both transmission and backscattering techniques.

Mössbauer spectrometry has not found many applications in such areas as surface physics and structural mechanics of bulk matter. This is mainly the result of thin sample requirement for the commonly used transmission geometry. It is, however, possible to eliminate this limitation by using a scattering technique in which no special sample preparation is required. At present this technique is not used since the results are not very satisfactory, certainly not as good as in a transmission geometry. There are several reasons for it: (1) low efficiency due to a very low solid angle subtended by previous detector configurations; (2) relatively pronounced interference (in the case of $CO^{57}$) by the 122 keV gamma ray-induced fluorescence as a result of low Mössbauer counting rates and (3) imprecise source-velocity definition in previous counting arrangements.

In a transmission geometry, the incident radiation passes through the Mössbauer absorber before falling on the detector at resonance, the absorption cross section rises sharply leading to a considerable reduction in the intensity of the transmitted radiation. The reemitted radiation, because of its isotropicity, does not entirely compensate for loss, in the forward direction, due to absorption out of the incident beam. The transmitted radiation spectrum, therefore, shows a net reduction in the counting rate at resonance velocity. Since only a certain fraction, Mössbauer fraction, of the incident beam exhibits resonance fluorescence, one is necessarily faced with a large nonresonant component at the detector. This nonresonant component has the net effect of reducing the S/N ratio, and consequently the resolution, in the transmission spectra. The situation could be considerably improved if the detector did not 'see' nonresonant component of the incident radiation. One way of achieving this is to use the scattering geometry in which the detector "sees" only the resonantly scattered radiation. Scattering technique in transmission geometry has not been used because the absorber must be thin, just as in the conventional absorption technique, to let the incident, as well as the reemitted, radiation pass through it.

Scattering technique in backscattering geometry has previously been used with considerable advantage. In this use the scatterer or sample is placed at an angle with the incident radiation. In such an arrangement, only the backscattered radiation can reach the detector and one should, therefore, except considerable improvement in the resolution in the spectra. However, even this technique has not yet been successfully exploited because of the extremely long counting periods needed for good statistical accuracy in the spectra.

It is therefore the primary object of this invention to provide a Mössbauer spectrometer that utilizes a scattering technique which provides better results than previous scattering and transmission techniques.

Another object of this invention is to provide a radiation counter for use in a Mössbauer spectrometer that has the advantages of subtending a very large solid angle at the scatterer and of 'seeing' only the scattered radiation.

Other objects and advantages of this invention will become apparent hereinafter in the specification and in the claims.

SUMMARY OF THE INVENTION

The invention is a versatile Mössbauer spectrometer that is efficient both in transmission and reflection geometries. It includes a radiation detector consisting of a 0.6 inch by 2 inches by 2 inches NaI(T1) crystal with a 0.6 diameter hole in its center. The crystal encapsulation incorporates 1.5 inch diameter, 0.005 inch thick front and back beryllium windows that permit easy penetration by the conversion X-rays and the reemitted 14.4 keV gamma rays into the sensitive region of the NaI(T1) crystal. The crystal is coupled, at its two ends, via quartz optical windows, to two matched photomultipliers. The electronic gains of the two photomultipliers are equalized and the signals at the respective collectors are added and amplified before passing through a single channel analyzer (SCA). The limits of the SCA are set to accept all pulses in the range of from 5 to 15 keV. These accepted pulses are applied through an inverter to an attenuator to a Mössbauer spectrometer.

DETAILED DESCRIPTION OF THE INVENTION

Figure 1:
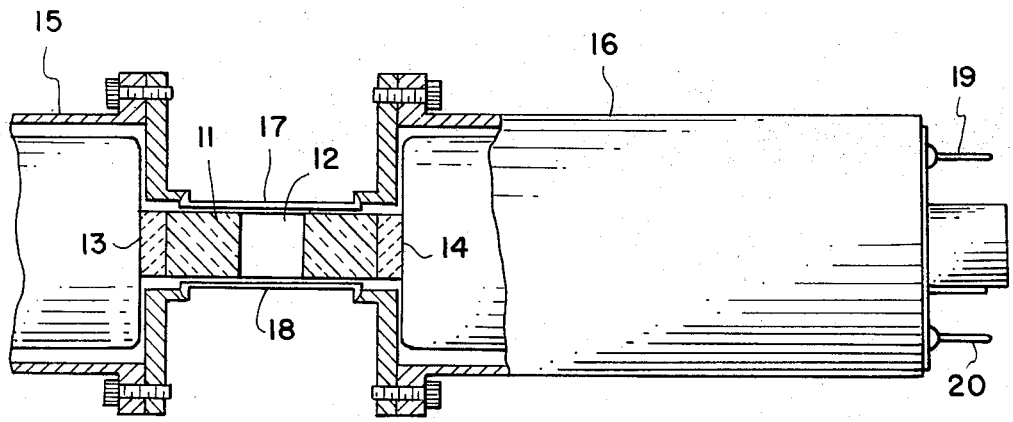
FIG. 1 is a cutaway view of the detector portion of this invention.

Turning now to the embodiment of the invention selected for illustration in the drawings the number 11 in FIG. 1 designates an NaI(T1) crystal. The dimensions of crystal 11 are 2 inches by 2 inches by 0.6 inch with a 0.6 inch diameter hole 12 at its center. Crystal 11 is coupled through one-fourth inch thick quartz optical windows 13 and 14 to photomultipliers 15 and 16, respectively. The crystal 11 is completely encapsulated with 1.5 inch diameter and 0.005 inch thick beryllium windows 17 and 18, plus any other suitable material. These beryllium windows 17 and 18 permit easy penetration by the conversion X-rays and the reemitted 14.4 keV gamma rays. Each of the photomultipliers 15 and 16 includes an input terminal 19 for applying a voltage and an output terminal 20 for removing the produced signals and provision for adjusting the focusing voltage to equalize the multiplier gains.

Even though crystal 11 has been disclosed as having a rectangular shape, it can be many different shapes. The only requirement is that crystal 11 be shaped on its two ends to provide for direct coupling of optical windows (light guides) to transmit all the scintillation radiation to the windows of the two photomultipliers. Also crystal 11 can have dimensions different from those disclosed without departing from the invention.

Figure 2:
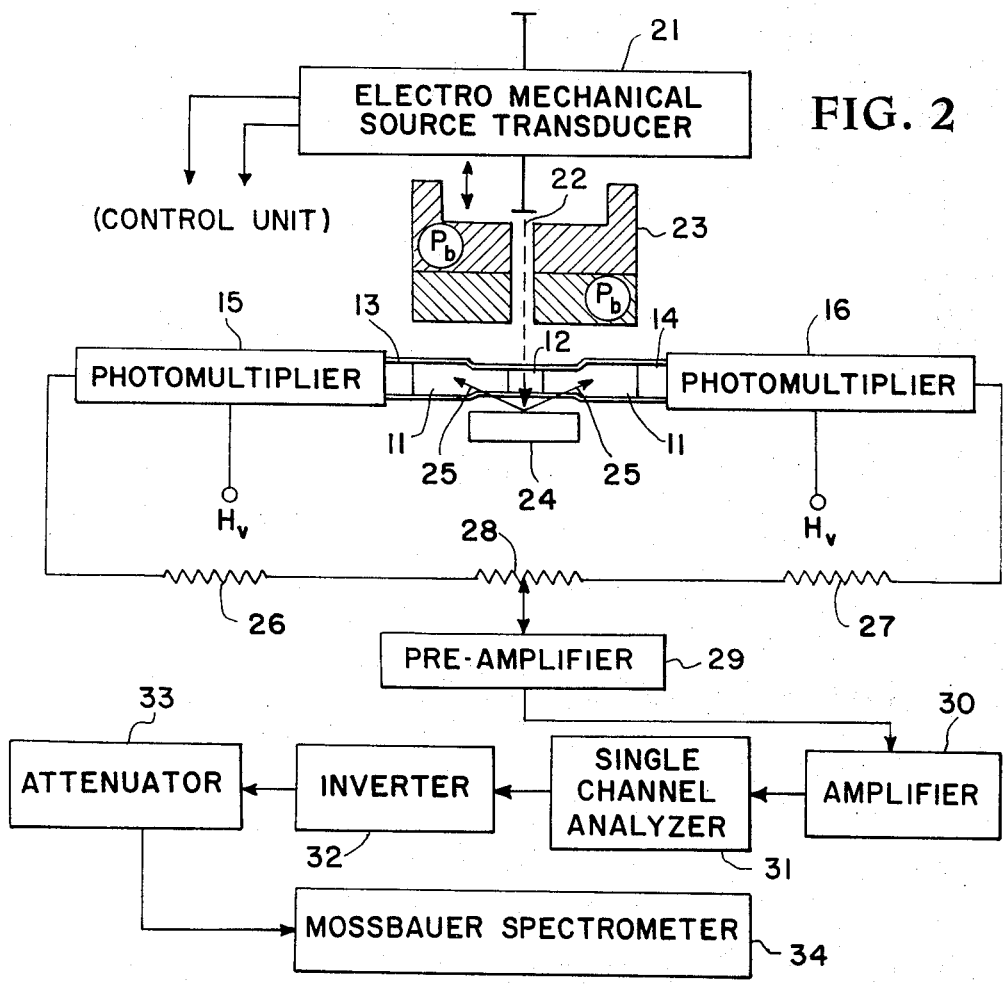
FIG. 2 is a block diagram showing the use of the detector in FIG. 1 in a backscattering geometry.

The detector disclosed in FIG. 1 can be used in both transmission and reflection geometries. FIG. 2 is a block diagram of the use of the detectors in FIG. 1 in a reflection or backscattering geometry. In this use, an electro-mechanical source transducer 21 controlled by control units (not shown) produces motion of the $Co^{57}$ source 21. The radiation emitted by this source is collimated by a collimator assembly 23. The collimated radiation beam 22 from the source 21 passes through the hole 12 of the detector and strikes the specimen 24 being studied. Specimen 24 is shown stationary; however, it could have motion as well as source transducer 21. The resulting backscattering radiation 25 is detected by the NaI(T1) crystal and then passed through the quartz optical windows to photomultipliers 15 and 16 which have a high voltage Hv applied to them. The solid angle subtended by the detector, at the point of beam 22 incidence on scatterer 24, can be maximized by adjusting the distance between the scatterer and the detector. The outputs of photomultipliers 15 and 16 are applied to a summing network consisting of resistors 26, 27 and a potentiometer 28. The purpose of potentiometer 28 is to equalize the sensitivities of the two photomultiplier channels. The sum of the outputs from photomultipliers appears at the slider of potentiometer 28. This sum voltage is amplified by preamplifier 29 and amplifier 30 and then applied to a single channel analyzer 31. The SCA 31 limits are adjusted to accept all pulses in the range of from 5 to 15 keV. The output of the SCA is applied, through an inverter 32 and an attenuator 33, to a Mössbauer spectrometer 34.

The advantages of this invention are numerous. It is highly efficient and equally suitable for transmission and backscattering geometries. When used under optimal conditions, the detector subtends a solid angle of 3.15 steradians at the specimen location. This high solid angle, coupled with freedom from non-Mössbauer radiation components at the detector, permits the use of more intense radiation sources thereby effecting an order of magnitude savings in time. Additionally, shorter run times eliminate the drawbacks associated with long time electronic gain drifts and thus lead to improved sensitivity of the Mössbauer spectrometers. Also, it can be used under environmental conditions without any special preparation of the sample or scatterer.

It is to be understood that the form of the invention herewith shown and described is to be taken as a preferred embodiment. Various changes can be made without departing from the spirit or scope of the invention as defined in the subjoined claims. For example, the shape, dimensions and composition of crystal 11, the source of incident radiation, and the balancing circuit for the two photomultipliers can be different from that disclosed without departing from the invention.

What is claimed as new and desired to be secured by Letters Patent of the United States is:

1. A detector for use in a Mössbauer spectrometer wherein a beam source of gamma rays irradiates a sample for producing secondary gamma rays characteristic of the Mössbauer effect comprising:
   a crystal having a composition suitable for detecting radiation caused by the Mössbauer effect and having a hole in it for passing the substantially unattenuated primary radiation of said beam source of gamma rays, and
   two photomultipliers connected to two sides of said crystal such that substantially all of the scintillation radiation produced by the radiation detected by said crystal flows out of said crystal into said two photomultipliers.

2. A detector according to claim 1 wherein the composition of said crystal is NaI(T1).

3. A detector according to claim 1 wherein said crystal is coupled to said two photomultipliers through two quartz optical windows.

4. A detector according to claim 3 including a beryllium window on each side of said hole.

5. A detector according to claim 3 including means for summing the outputs of said two photomultipliers.

6. A detector according to claim 5 including means for equalizing the sensitivities of the two photomultipliers.

* * * * *